Nov. 28, 1967 MASAHISA MIYAGI 3,355,553

SYNCHRONIZING SYSTEM FOR MULTIFREQUENCY CARRIER TRANSMISSION

Filed March 19, 1965

INVENTOR
MASAHISA MIYAGI

BY
Hopgood & Calimafde
ATTORNEYS

United States Patent Office 3,355,553
Patented Nov. 28, 1967

3,355,553
SYNCHRONIZING SYSTEM FOR MULTI-FREQUENCY CARRIER TRANSMISSION

Masahisa Miyagi, Tokyo, Japan, assignor to Nippon Electric Company Limited, Tokyo, Japan, a corporation of Japan Filed Mar. 19, 1965, Ser. No. 441,222
Claims priority, application Japan, Mar. 21, 1964, 39/15,539
13 Claims. (Cl. 179—15)

This invention relates to a synchronizing system for multifrequency carrier transmission, such as radio transmission of pulse-code-modulated waves or transmission of a multifrequency carrier modulated by Teletype signals, wherein two or more pilot carrier waves are transmitted simultaneously with the carrier wave or waves for transmitting the main information signal, so that bit synchronizing signals which play the most important role in transmission may be produced in the receiver apparatus from the pilot carrier waves.

Bit synchronism is very important in a radio transmission system wherein synchronization means are employed, however, the synchronizing signals are often adversely affected by noise and become difficult to detect. Furthermore, detection of the synchronizing signals from the signal pulse series requires rather complicated apparatus. In case the clock pulses are subject to frequency modulation, which will occur due to the Doppler effect, the detector for the synchronizing signals must have very quick response.

Accordingly, it is an object of this invention to provide a synchronizing system for a multifrequency carrier transmission system whereby synchronism is achieved with quick response characteristics and which is simple, rather than complicated in operation, thereby to provide an excellent system of the type referred to.

All of the objects, features and advantages of this invention and the manner of attaining them will become more apparent and the invention itself will be best understood by reference to the following description of an embodiment of the invention taken in conjunction with the accompanying drawing, in which.

This invention provides, in a multifrequency carrier transmission system, a synchronizing system characterized in that the output of an oscillator is modulated by clock pulses or by frequency-multiplied or frequency-divided pulses thereof, particular side-band components being selected from the side-band components produced by such modulation. At least one carrier wave for carrying the main information signal and at least two pilot carrier waves of different frequencies are obtained, for simultaneous transmission, from the particular side-band components or carrier waves derived by frequency multiplication or frequency conversion among such selected side-band components. In the receiver, pilot carrier waves are extracted, and a frequency-difference signal between the pilot carrier frequencies is obtained by interdetection between the pilot carrier waves, such signal being produced for use in maintaining bit synchronism, and which is in synchronism with the frequency-multiplied or frequency-divided clock pulse train of the transmitter.

In the description of the invention, reference is made to clock pulses and to other pulses derived from a clock pulse source, however, it will be appreciated that any suitable pulse train may be employed in lieu thereof.

Figure 1:
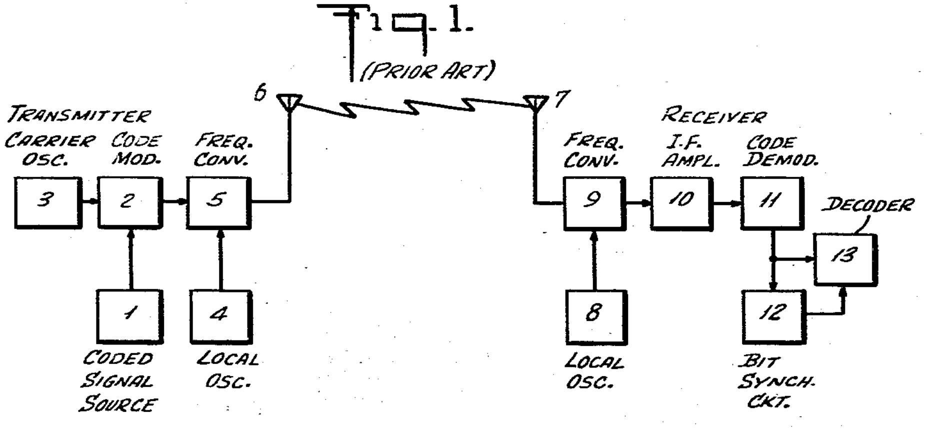
FIG. 1. (PRIOR ART)
FIG. 1 shows a conventional system for radio transmission of coded signals.

Referring first to the conventional arrangement of FIG. 1, a transmitter is provided wherein the pulse output of a coded signal source 1 is fed to a code modulator 2 to modulate in amplitude, phase, or frequency, for example, the output of a carrier oscillator 3. The output of the modulator 2 is applied, together with the output of a transmitter local oscillator 4, to a frequency converter 5 to be converted into oscillations at the transmission frequency, which are transmitted by a transmission antenna 6. If desired, a power amplifier stage may be placed between the converter 5 and the antenna 6, as will be known to those skilled in the art.

Referring next to the receiver of FIG. 1, the signal received by a reception antenna 7 is fed, together with the output of a receiver local oscillator 8, to a frequency converter 9, to be converted into an intermediate-frequency signal. This signal is amplified by an intermediate-frequency amplifier 10 and then demodulated into a coded signal by a code demodulator 11. The coded signal is then decoded by a decoder 13 with the aid of a bit-synchronizing signal developed from the coded signal by a bit-synchronizing circuit 12.

If the bit-synchronizing circuit 12 is composed of a narrow band-pass filter for developing the fundamental wave component, restriction is imposed on the speed of response by the width of the pass band of the filter, with the result that the bit-synchronism circuit function is unsatisfactory. This is of particular importance when the received signal undergoes the Doppler effect.

Figure 2:
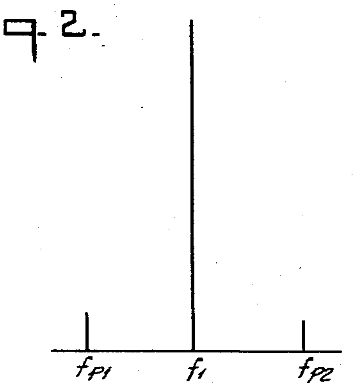
FIG. 2 illustrates the principle on which the carrier waves are generated for use in an embodiment of this invention.

Referring now to FIG. 2, $f_1$ indicates a main carrier wave for carrying the main information signal and $f_{p1}$ and $f_{p2}$ are two pilot carrier waves of different frequencies, respectively, below and above the frequency of the main carrier wave. The pilot carrier waves are transmitted simultaneously with the main carrier wave at reduced power levels so as not to produce any appreciable loss in the power of the main carrier wave, and are received with reduced pass bands, respectively, so that their $C/N$ ratios may be kept as high as, or even higher, than that of the main information signal. The ordinates in FIG. 2 show the relative power levels of the carrier waves with respect to one another. It should be noted that the difference between the pilot frequencies $f_{p1}$ and $f_{p2}$ is made equal to an integral multiple $nf_0$ or an integral submultiple $f_0/n$ of the repetition frequency $f_0$ of the transmitter clock pulses. Such pilot carrier waves may be produced in the transmitter by extracting the side-band components obtained when the output of the carrier oscillator is modulated by pulses derived by frequency multiplication or frequency division of clock pulses from the coded signal source.

Figure 3:
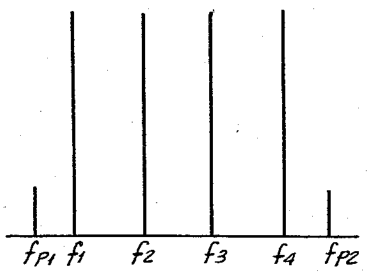
FIG. 3 illustrates the carrier waves for use in another embodiment of the invention.

Referring next to FIG. 3, $f_1$, $f_2$, $f_3$, and $f_4$ represent main carrier waves which cooperate with one another in the main information signal, and $f_{p1}$ and $f_{p2}$ are two pilot carrier waves of different frequencies. The four main carrier waves may be used, for example, to transmit the main information signal by frequency-shift keying the same at four levels. The ordinates show the relative power levels of these carrier waves. The difference $f_{p1}—f_{p2}$ between the pilot frequencies $f_{p1}$ and $f_{p2}$ is made equal to an integral multiple or submultiple of the repetition frequency of the transmitter clock pulses.

Figure 4:
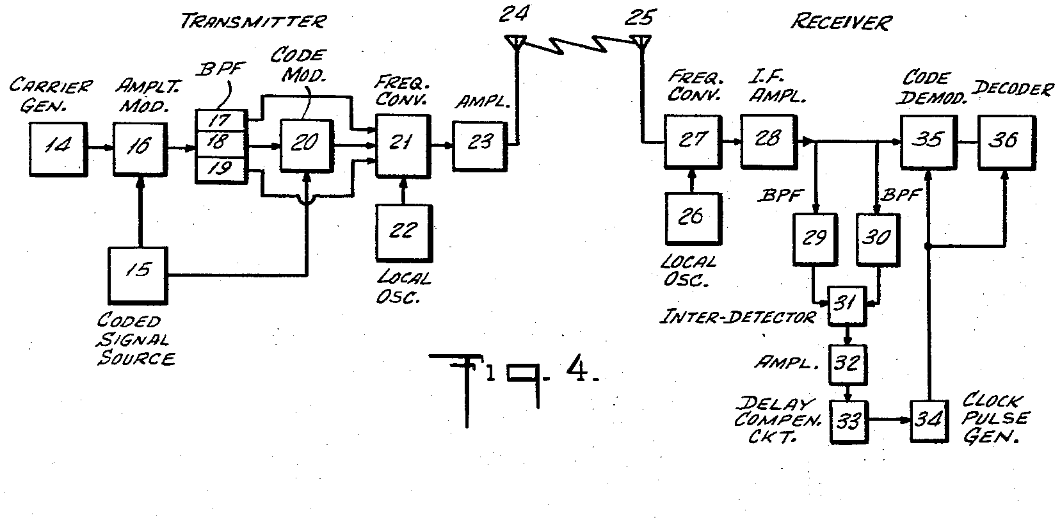
FIG. 4 shows an embodiment of the invention as used in a system for multifrequency carrier transmission.

Referring now to FIG. 4, the output of a transmitter carrier generator 14 is modulated in an amplitude modulator 16 by clock pulses supplied thereto from a coded signal source 15. The produced carrier component and both side-band components are separated from one another by band-pass filters 17, 18, and 19, which serve as carrier sources. One of the carrier waves thus obtained, such as for example that from the filter 18, is further supplied to a code modulator 20 to be code-modulated by a signal sent thereto from the coded signal source 15. The output of the code modulator 20 and the respective outputs of the remaining band-pass filters 17 and 19 are supplied to a frequency converter 21 to be frequency-converted with the aid of a transmitter local oscillator 22. The output of the converter 21 is preferably then supplied to a power amplifier 23 to be amplified and then to the antenna 24 to be transmitted. The electromagnetic waves radiated from the antenna 24 include the pilot carrier waves $f_{p1}$ and $f_{p2}$ as illustrated in FIG. 2. The frequency difference between these pilot carrier waves is equal to the repetition frequency of the transmitter clock pulses.

In the receiver, the input signals received by a common reception antenna 25 are frequency-converted by a frequency converter 27 with the aid of the output of a receiver local oscillator 26 and are supplied to an intermediate-frequency amplifier 28 to be amplified. From these amplified signals, the pilot carrier waves are extracted by pilot-extracting band-pass filters 29 and 30 adapted to the respective pilot frequencies $f_{p1}$ and $f_{p2}$. These pilot carrier waves are supplied to an interdetector 31 for developing the difference-frequency signal, which is amplified by an amplifier 32, adjusted by a delay-compensation circuit 33, and supplied to a receiver clock pulse generator 34 to produce, in perfect synchronism with the transmitter clock pulses, receiver clock pulses for use in maintaining the bit-synchronism. The delay-compensation circuit 33, when once adjusted between the modulator and the demodulator or between the transmitter and the receiver, requires no subsequent adjustment. If desired, however, provision may be made to automatically adjust the delay, by means of a suitable sensing or hunting circuit, as will be known to those skilled in the art. The amplified intermediate-frequency signals are also supplied to a code demodulator 35 to be demodulated, the demodulated output thereof then being supplied to a decoder 36. Inasmuch as the receiver clock pulses are in perfect synchronism with those in the transmitter, the desired demodulation and decoding is then easily accomplished.

While the invention has been explained in conjunction with a specific embodiment thereof, it should be clearly understood that the invention is not restricted to such embodiment and that it is possible to carry out various modifications without departing from the spirit and scope of the invention. Also, the carrier waves employed may not necessarily be radio carrier waves but may be wired carrier waves. Furthermore, it will also be appreciated that only those parts of the embodiment which have direct relationship with the invention have been explained, the other component parts to be employed being well known to those knowledgeable in the art.

What is claimed is:

1. A synchronizing system for multifrequency carrier transmission characterized in that the same includes:

a transmitter, said transmitter including:

an oscillator having an output modulated by pulses from a clock pulse generator, means for selecting particular side-band components from a plurality of side-band components produced by such modulation, and means for producing at least one carrier wave for carrying the main information signal and at least two pilot carrier waves of different frequencies for simultaneous transmission in a composite wave;

and a receiver, said receiver including:

means for extracting said pilot carrier waves from said composite waves, interdetection means for developing a frequency-difference signal from said pilot carrier waves, and means for utilizing said frequency difference signal to maintain bit-synchronism with a pulse signal train having a frequency which is a multiple or sub-multiple of the frequency of said clock pulses.

2. A synchronizing system for multifrequency carrier transmission which includes:

a transmitter, said transmitter including:

a carrier wave generator and a first modulator for receiving an output therefrom, a pulse train generator having its output fed to said modulator to modulate said carrier wave therein, the output of said modulator including said carrier wave and a plurality of side-band components, means for selecting particular side-band components from said plurality thereof, a second modulator for receiving the modulated carrier wave from said first modulator and for modulating the same by signals from said pulse train generator, and means for receiving the modulated carrier wave from said second modulator and for receiving said particular selected side-band components, to produce for transmission a composite wave comprising said carrier wave and at least two pilot carrier waves of different frequencies;

and a receiver, said receiver including:

first means for receiving said composite wave, means coupled to said first means for extracting said pilot carrier waves from said composite wave, interdetection means for developing a frequency-difference signal from said pilot carrier waves, a receiver pulse train generator, means for utilizing said frequency-difference signal to maintain bit-synchronism between the pulse train in said transmitter and the pulse train in said receiver, and demodulating means coupled to said first means and to said receiver pulse train generator for demodulating the transmitted wave.

3. A synchronizing system for multifrequency carrier transmission which includes:

a transmitter, said transmitter including:

a carrier wave generator and a first modulator for receiving an output therefrom, a coded signal source having its output fed to said modulator to modulate said carrier wave therein, the output of said modulator including said carrier wave and a plurality of side-band components, means for selecting particular side-band components from said plurality thereof, a code modulator for receiving the modulated carrier wave from said first modulator and for modulating the same by signals from said coded signal source, and frequency converting means for receiving the modulated carrier wave from said code modulator and for receiving said particular selected side-band components, to produce for transmission a composite wave comprising said carrier wave for carrying a main information signal and at least two pilot carrier waves of different frequencies;

and a receiver, said receiver including:

frequency converting means for receiving said composite wave, means coupled to said receiver frequency converting means for extracting said pilot carrier waves from said composite wave, interdetection means for developing a frequency-difference signal from said pilot carrier waves, a receiver pulse train generator, means for utilizing said frequency-difference signal to maintain bit-synchronism between signals from said coded signal source in said transmitter and the pulse train in said receiver, code demodulating means coupled to said frequency converting means in said receiver and to said pulse train generator, and decoding means coupled to said code demodulating means and to said pulse train, generator for providing at the receiver, information from the coded signal at the transmitter.

4. The invention described in claim 3 wherein said means for selecting particular side-band components comprises a band-pass filter for each side band component selected, said system further including a band-pass filter connected between said first modulator and said code modulator for passing said modulated carrier from said first modulator.

5. The invention described in claim 3 wherein said means for utilizing said frequency-difference signal comprises signal delay compensation means connected between said interdetection means and said receiver pulse train generator to produce perfect synchronism between said latter pulse train and the signals from said coded signal source in said transmitter.

6. The invention described in claim 3 wherein said first modulator is an amplitude modulator.

7. The invention described in claim 3 wherein said means for extracting said pilot carrier waves comprises a band-pass filter for each such wave.

8. A transmitter for a multifrequency carrier transmission system comprising:

a carrier wave generator and a first modulator for receiving an output therefrom, a pulse train generator having its output fed to said modulator to modulate said carrier wave therein, the output of said modulator including said carrier wave and a plurality of side-band components, means for selecting particular side-band components from said plurality thereof, a second modulator for receiving the modulated carrier wave from said first modulator and for modulating the same by signals from said pulse train generator, and means for receiving the modulated carrier wave from said second modulator and for receiving said particular selected side-band components, to produce for transmission a composite wave comprising said carrier wave and at least two pilot carrier waves of different frequencies.

9. A transmitter for a multifrequency carrier transmission system comprising:

a carrier wave generator and a first modulator for receiving an output therefrom, a coded signal source having its output fed to said modulator to modulate said carrier wave therein, the output of said modulator including said carrier wave and a plurality of side-band components, means for selecting particular side-band components from said plurality thereof, a code modulator for receiving the modulated carrier wave from said first modulator and for modulating the same by signals from said coded signal source.

and frequency converting means for receiving the modulated carrier wave from said code modulator and for receiving said particular selected side-band components, to produce for transmission a composite wave comprising said carrier wave for carrying a main information signal and at least two pilot carrier waves of different frequencies.

10. A transmitter for a multifrequency carrier transmission system comprising:

a carrier wave generator and a first modulator for receiving an output therefrom, a coded signal source having its output fed to said modulator to modulate said carrier wave therein, the output of said modulator including said carrier wave and a plurality of side-band components, first and second band-pass filters for selecting particular side-band components from said plurality thereof, a third band-pass filter for receiving said modulated carrier, a code modulator for receiving the modulated carrier wave from said third band-pass filter, and for modulating the same by signals from said coded signal source, and frequency converting means for receiving the modulated carrier wave from said code modulator and for receiving said particular selected side-band components from said first and second band-pass filters, to produce for transmission a composite wave comprising said carrier wave for carrying a main information signal and at least two pilot carrier waves of different frequencies.

11. A receiver for a multifrequency carrier transmission system comprising:

first means for receiving a composite wave, said composite wave including a carrier wave and two pilot carrier waves, second means coupled to said first means for extracting said pilot carrier waves from said composite wave, interdetection means coupled to said second means for developing a frequency-difference signal from said pilot carrier waves, a pulse train generator, means for utilizing said frequency-difference signal to maintain bit-synchronism between a pulse train in a transmitter and the pulse train from said generator, and demodulation means coupled to said first means and to said pulse train generator for demodulating the transmitted wave.

12. A receiver for a multifrequency carrier transmission system comprising:

frequency converting means for receiving a composite wave, said composite wave including a carrier wave and two pilot carrier waves, means coupled to said frequency converting means for extracting said pilot carrier waves from said composite wave, interdetection means for developing a frequency-difference signal from said pilot carrier waves, a pulse train generator, means for utilizing said frequency-difference signal to maintain bit-synchronism between signals from a coded signal source in a transmitter and the pulse train from said generator, code demodulating means coupled to said frequency converting means and to said pulse train generator, and decoding means coupled to said code demodulating means and to said pulse train generator for providing information from said composite wave.

13. A receiver for a multifrequency carrier transmission system comprising:

frequency converting means for receiving a composite wave, said composite wave including a carrier wave and two pilot carrier waves, band-pass filters coupled to said frequency converting means for extracting said pilot carrier waves from said composite wave, interdetection means for developing a frequency-difference signal from said pilot carrier waves, a pulse train generator, delay compensation means for utilizing said frequency-difference signal to maintain bit-synchronism between signals from a coded signal source in a transmitter and the pulse train from said generator, code demodulating means coupled to said frequency converting means and to said pulse train generator, and decoding means coupled to said code demodulating means and to said pulse train generator for providing information from said composite wave.

References Cited

UNITED STATES PATENTS 3,202,765 8/1965 Byrne ---------------- 179—15

JOHN W. CALDWELL, *Acting Primary Examiner.*

R. L. GRIFFIN, *Assistant Examiner.*